United States Patent
Yoshida et al.

(10) Patent No.: US 7,105,962 B2
(45) Date of Patent: Sep. 12, 2006

(54) BRUSHLESS MOTOR FOR PARTABLE ELECTRONIC EQUIPMENT WITH WIRE TREATMENT TECHNIQUE OF COILS

(75) Inventors: Shigeru Yoshida, Touhaku-gun (JP); Kodo Fukuoka, Yonago (JP); Masafumi Kumoi, Yonago (JP); Koji Kuyama, Yonago (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/343,485

(22) PCT Filed: Jul. 26, 2001

(86) PCT No.: PCT/JP01/06486

§ 371 (c)(1),
(2), (4) Date: Jan. 31, 2003

(87) PCT Pub. No.: WO02/13355

PCT Pub. Date: Feb. 14, 2002

(65) Prior Publication Data

US 2003/0151317 A1    Aug. 14, 2003

(30) Foreign Application Priority Data

Aug. 3, 2000    (JP)    ............................. 2000-235053

(51) Int. Cl.
H02K 11/00    (2006.01)
(52) U.S. Cl. ........................................................ 310/71
(58) Field of Classification Search ................ 310/260, 310/216, 71, 214, 254, 259; 360/97.1–99.9; 29/596–598
See application file for complete search history.

(56) References Cited

U.S. PATENT DOCUMENTS

| | | | | | |
|---|---|---|---|---|---|
| 5,194,775 | A | * | 3/1993 | Cooper | 310/260 |
| 5,214,331 | A | * | 5/1993 | Nishimura et al. | 310/71 |
| 5,268,604 | A | * | 12/1993 | Katakura | 310/71 |
| 5,635,781 | A | * | 6/1997 | Moritan | 310/71 |
| 6,274,955 | B1 | * | 8/2001 | Satoh et al. | 310/81 |
| 6,369,474 | B1 | * | 4/2002 | Tanaka et al. | 310/71 |
| 6,479,914 | B1 | * | 11/2002 | Yoshida et al. | 310/81 |
| 6,486,579 | B1 | * | 11/2002 | Furuya et al. | 310/81 |
| 6,570,280 | B1 | * | 5/2003 | Takahashi | 310/71 |

FOREIGN PATENT DOCUMENTS

| | | |
|---|---|---|
| JP | 3-80675 | 8/1991 |
| JP | 9-70162 | 3/1997 |
| JP | 9-247881 | 9/1997 |
| JP | 9-308169 | 11/1997 |
| JP | 10-022152 | 1/1998 |
| JP | 10-309054 | 11/1998 |
| JP | 2000-201464 | 7/2000 |

(Continued)

OTHER PUBLICATIONS

Translation of JP 2001145291 A.*

*Primary Examiner*—Darren Schuberg
*Assistant Examiner*—Nguyen Hanh
(74) *Attorney, Agent, or Firm*—Steptoe & Johnson LLP

(57) ABSTRACT

A brushless motor, comprising a rotor having a magnet, a coil for generating a magnetic field for drivingly rotating the rotor, and a power supply terminal for supplying a power to the coil from outside, wherein all electrical connection parts ranging from the power supply terminal to the end of the coil are connected to each other through welded parts.

10 Claims, 13 Drawing Sheets

FOREIGN PATENT DOCUMENTS

| | | |
|---|---|---|
| JP | 2000-324753 | 11/2000 |
| JP | 2001-145291 | 5/2001 |
| JP | 2001-145306 | 5/2001 |
| JP | 2001-231209 | 8/2001 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

BRUSHLESS MOTOR FOR PARTABLE ELECTRONIC EQUIPMENT WITH WIRE TREATMENT TECHNIQUE OF COILS

TECHNICAL FIELD

The present invention mainly relates to a small brushless motor suitably used for portable electronic equipment and a method of manufacturing the same, and particularly concerns a wire treatment technique of its coil.

BACKGROUND ART

In a process of connecting the ends of coils to external power supply terminals in a small brushless motor, in general, wire treatment is performed using terminals and a treated part is soldered to have electric conduction.

For instance, a representative example is disclosed in JP-A-6-46543. In this example, a core has a plurality of salient poles extending radially from a ring part and coils are wound around the salient poles. Further, slots between the salient poles have terminals, and the ends of coils are connected to the terminals by winding. The terminals have coil end winding portions which are formed so as to be bent in the axial direction of the core and can be soldered onto external power supply terminals, each being arranged at a position on one side of the coil along the axial direction of the core. Such terminals are often used for small brushless motors.

Another publicly known technique is disclosed in JP-A-4-193053. Conventionally, a resin-molded insulator has been frequently placed on an end face of a core to secure insulation between the core and a coil. In such a publicly known technique, a terminal of a thin metallic plate is embedded into a part of the insulator, the part corresponding to a salient pole. Then, the coil is wound and held so as to bind the salient pole and the terminal. A coil end winding portion on the end of the terminal is formed so as to be bent in the axial direction and is soldered onto a printed wiring board which is adjacent to one side of the coil. With such a configuration, since the terminals are held by the salient poles, even thin and small terminals can be correctly positioned and soldered on external power supply terminals.

In the case of electronic equipment, when an electronic component is mounted on a printed board, soldering is performed according to a method of dipping into a soldering bath, a method of melting cream solder by reflow heating, and so on. However, as global environmental pollution has been a focus of attention in recent years, lead contained in a soldering material has become controversial. For this reason, in a component mounting process, a soldering material containing lead has been converted to a lead-free soldering material. The same demand is made on motors and conversion is demanded to a lead-free soldering material or a method of using no soldering material.

In response to such a demand, a lead-free soldering material may be selected. However, there is another factor that forces conversion to a joining method using no soldering material. For example, in a motor configured such that reflow mounting can be made on a substrate of a mobile phone, when a soldered part exists in the motor, heat of reflow heating is conducted to the soldered part and causes melting again because the motor is quite small. Such a problem has not been found in conventional motors which have not been devised based on reflow mounting. However, this problem is expected to be a significant problem to be solved for microminiature motors which will increase in number. In order to respond to this problem, conversion should be made to a joining method using no soldering material.

As a method of making electrical connection using no soldering material on a wire-treated part of winding, for example, a fusing method disclosed in JP-A-63-228937 has been known. In this technique, a terminal is adjacent to a coil wound around a core and has a hook. The winding terminal of the coil is connected to the terminal via the hook, and then, joining is performed by heating the hook by energization and applying pressure thereon.

However, the fusing method requires a large vacant space around the terminal. This is because it is necessary to pass a tool for heating by energization while sandwiching the hook of the terminal between both sides and applying pressure thereon. Therefore, this method is not applicable to a small and high-density motor which does not have a sufficient space around a terminal.

SUMMARY OF THE INVENTION

Thus, the present invention has an object to provide a wire treatment technique which can make electrical connection without using a soldering material even when a terminal is used but a sufficient space cannot be obtained around the terminal in a brushless motor, thereby achieving a small brushless motor which causes little environmental pollution and prevents reheating of reflow mounting or the like from degrading the quality.

In order to attain the above object, a brushless motor of the present invention comprises a rotor having a magnet, a coil for generating a magnetic field for rotatively driving the rotor, and a power supply terminal for supplying a power to the coil from outside, wherein all electrical connection portions ranging from the power supply terminal to the end of the coil are joined by welding.

Further, the brushless motor of the present invention comprises a rotor having a magnet, a coil for generating a magnetic field for rotatively driving the rotor, a core for winding the coil, and a plurality of terminals composed of metallic members, wherein the core has a ring part and a plurality of salient poles extending radially from the ring part, the coil being wound around the salient pole, the terminal has a metal exposure surface for connecting an earth electrode for welding, and the end of the coil is connected to the terminal by winding and then the end is joined by arc welding.

With this configuration, since all the electrical connection portions ranging from the end of the coil to the power supply terminal are joined by welding, or since the end of the coil is connected to the terminal by winding and then the end is joined by arc welding, it is possible to obtain a reliable motor which can eliminate solder on the electrical connection portions with little environmental pollution and does not degrade the quality of the electrical connection portions even in the case of severe temperature environments for mounting and use. Moreover, to make electrical connection, means of caulking, crimping, screwing, and so on are available in addition to soldering and welding. In each of these means, a connecting structure occupies a large space. Unlike these means, welding makes the connecting structure to occupy a small space equivalent to a space required by soldering. Hence, it is possible to provide a small and reliable brushless motor.

PREFERRED EMBODIMENTS

Description of the Prior Art

Prior to description of embodiments of the present invention, for reference, examples of publicly known brushless motors will be discussed in accordance with FIGS. 11 to 13.

Figure 11:
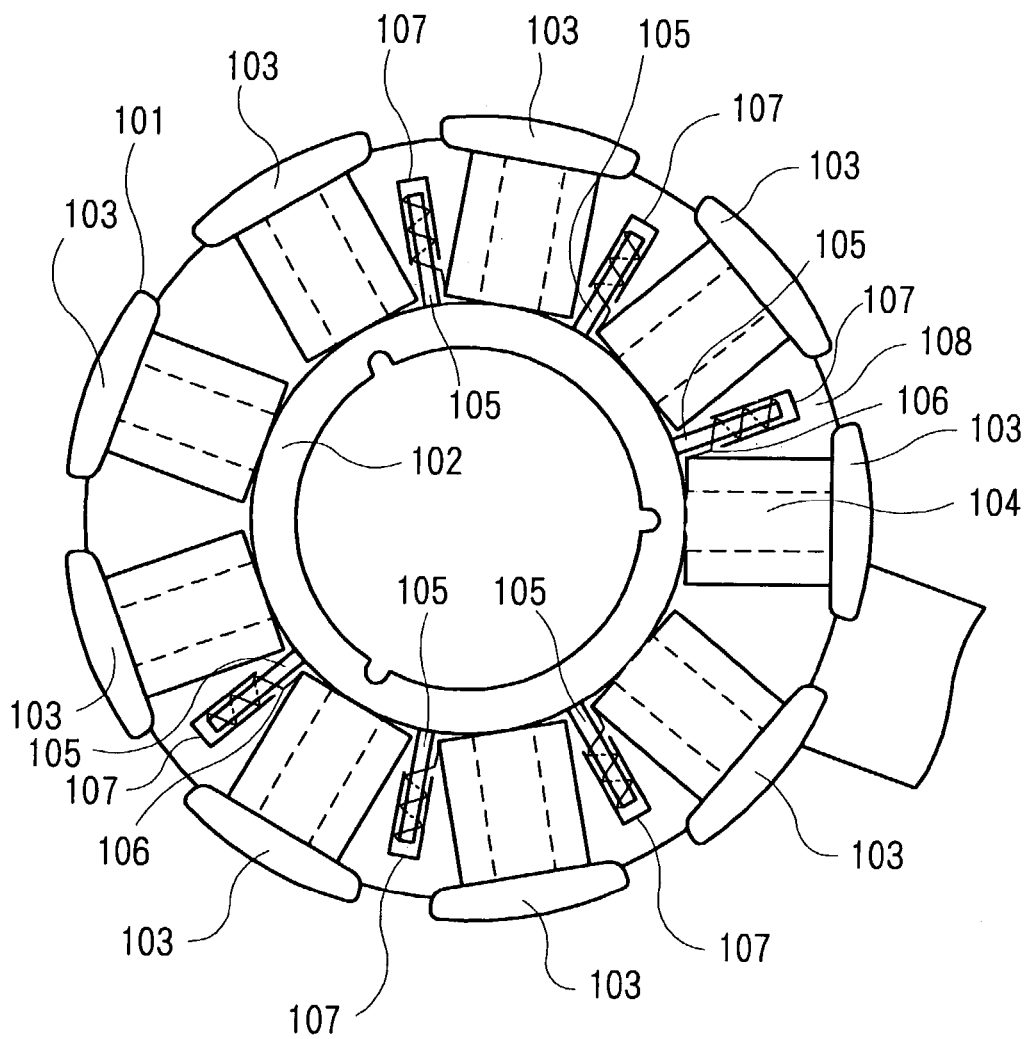
FIG. 11 is a diagram showing a stator assembly of a motor according to a first conventional art.

Referring to FIG. 11, the technique disclosed in JP-A-6-46543 will be discussed below. In this example, a core 101 has a plurality of salient poles 103 extending radially from a ring part 102 and coils 104 are wound around the salient poles 103. Slots between the salient poles 103 have terminals 105, and coil ends 106 are connected to the terminals 105 by winding. The terminals 105 have coil end winding portions which are formed so as to be bent in the axial direction of the core 101 and can be soldered onto external power supply terminals 107, (in this case, lands on a flexible printed circuit board 108), each being placed at a position on one side of the coil 104 along the axial direction of the core 101.

Figure 12:
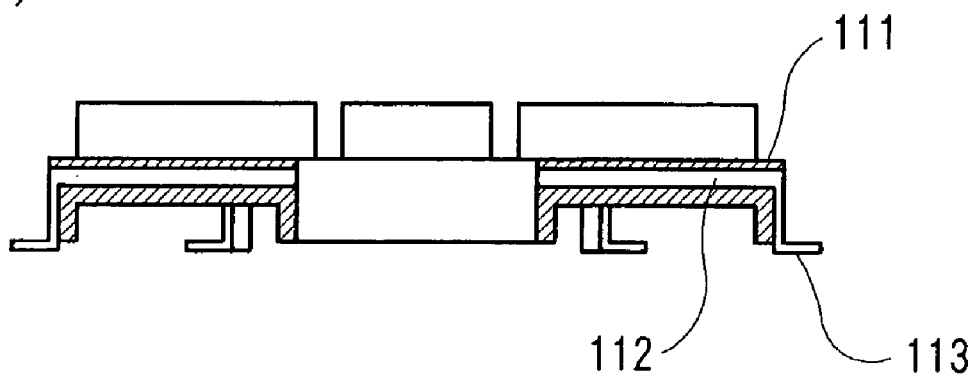
FIG. 12 is a diagram showing an insulator of a motor according to a second conventional art.
Figure 12:
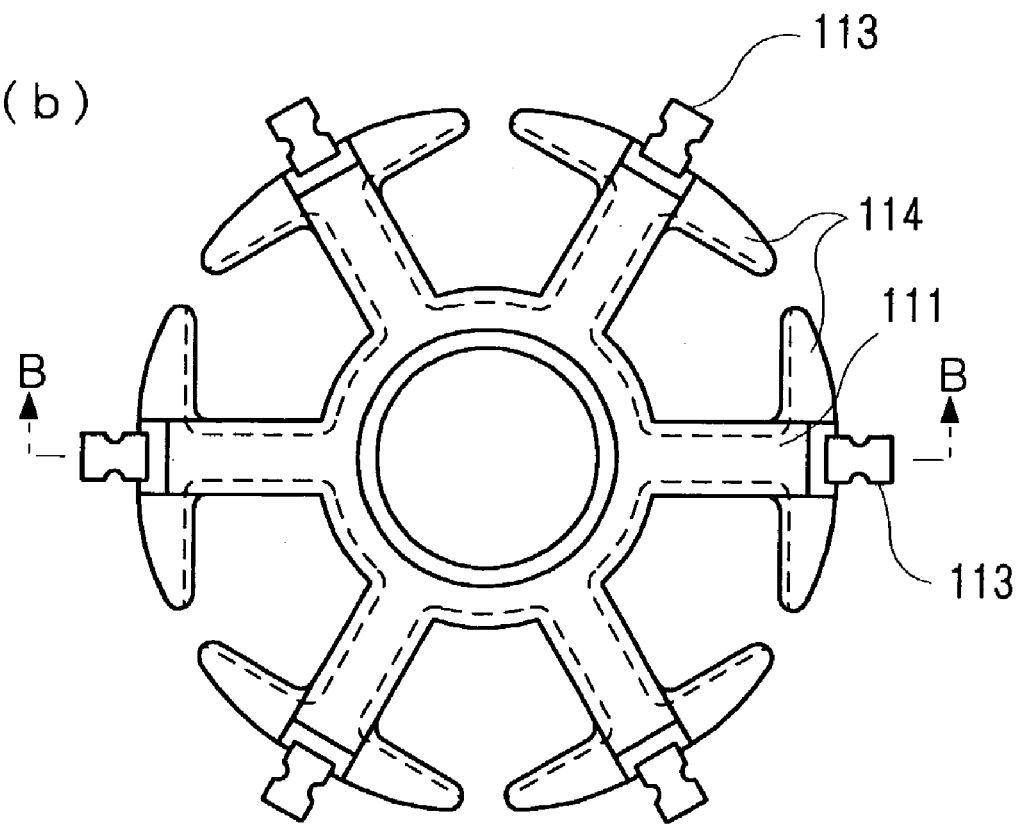

The technique disclosed in JP-A-4-193053 is shown in FIG. 12. FIG. 12(a) is a sectional view taken along a line B—B of FIG. 12(b). Conventionally, a resin-molded insulator has been frequently placed on an end face of a core to secure insulation between the core and a coil. In this case, a terminal 112 of a thin metallic plate is embedded into a part of an insulator 111, the part corresponding to a salient pole 114. Then, a coil (not shown) is wound and held so as to bind the salient pole 114 and the terminal 112. A coil end winding portion 113 on the end of the terminal 112 is formed so as to be bent in the axial direction and is soldered on a printed wiring board (external power supply terminals provided thereon any of them is not shown) which is adjacent to one side of the coil. With such a configuration, since the terminals 112 are held by the salient poles 114, even thin and small terminals can be correctly positioned and soldered on external power supply terminals.

Figure 13:
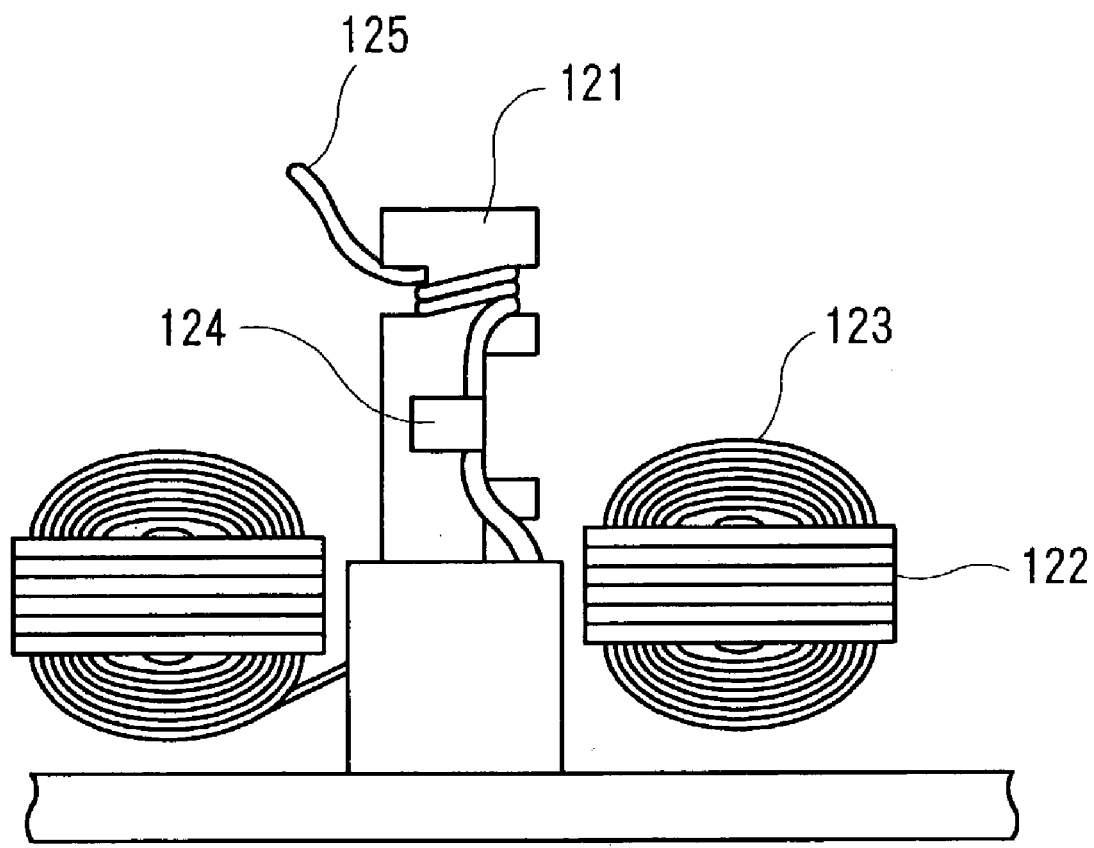
FIG. 13 is a perspective view showing a stator assembly of a motor according to a third conventional art.

FIG. 13 shows the fusing method disclosed in JP-A-63-228937. In this method, a terminal 121 is adjacent to coils 123 wound around a core 122 and has a hook 124. A end of coil winding 125 is connected to the terminal 121 via the hook 124 and joining is performed by heating the hook 124 by energization and applying pressure thereon.

However, the fusing method requires a large vacant space around the terminal 121. This is because it is necessary to pass a tool for heating by energization while sandwiching the hook 124 of the terminal 121 between both sides and applying pressure thereon. Therefore, this method is not applicable to a small and high-density motor which does not have a sufficient space around a terminal.

Description of Embodiment of the Present Invention

The present invention is achieved to solve the problem of the conventional art. The following will discuss the embodiments in accordance of the accompanied drawings.

EMBODIMENT 1

Figure 1:
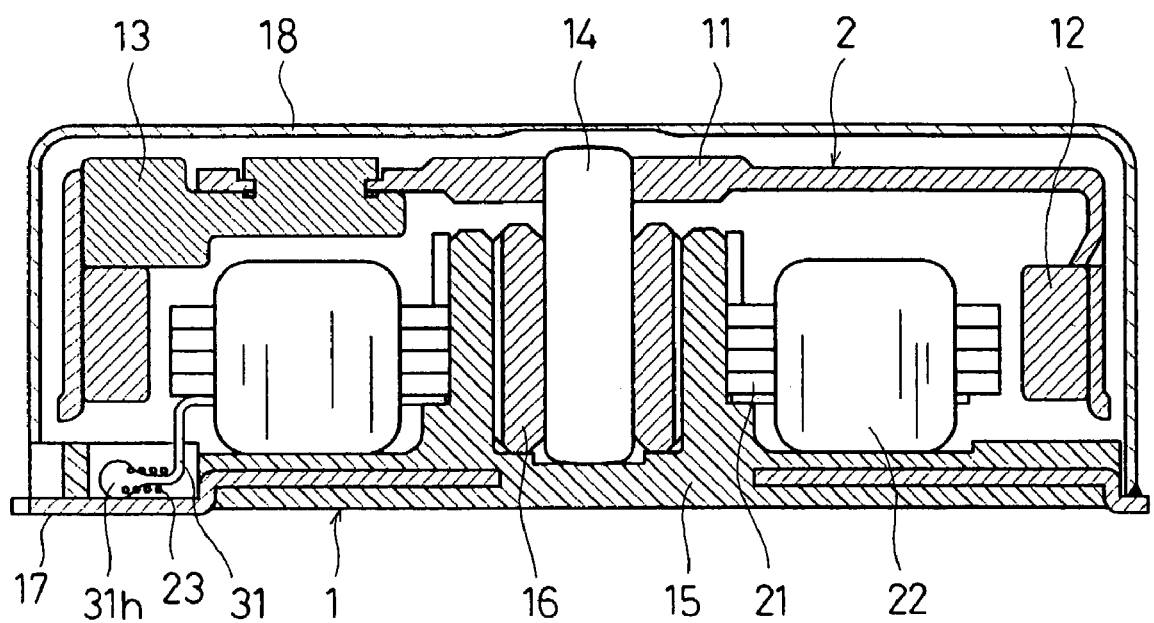
FIG. 1 is a sectional view showing a structure of a buushless motor according to Embodiment 1 of the present invention.
Figure 2:
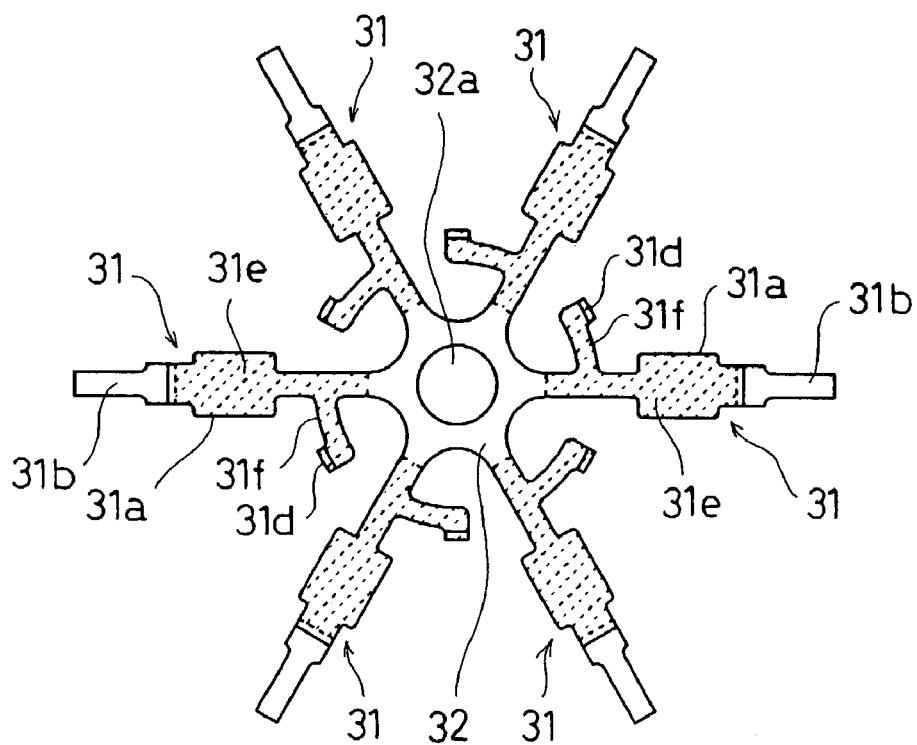
FIGS. 2(a) and 2(b) are diagrams showing that terminals of FIG. I are connected via a connecting member.
Figure 2:
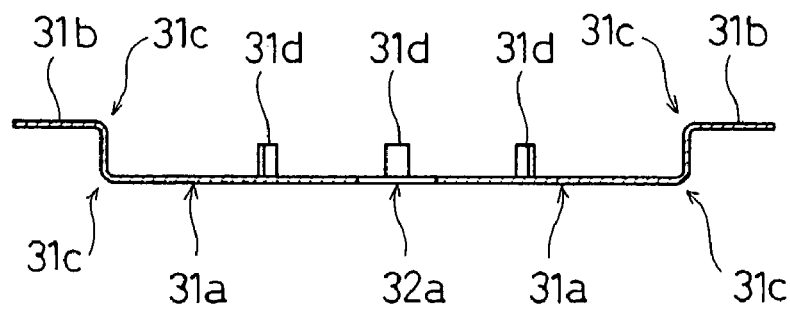
Figure 3:
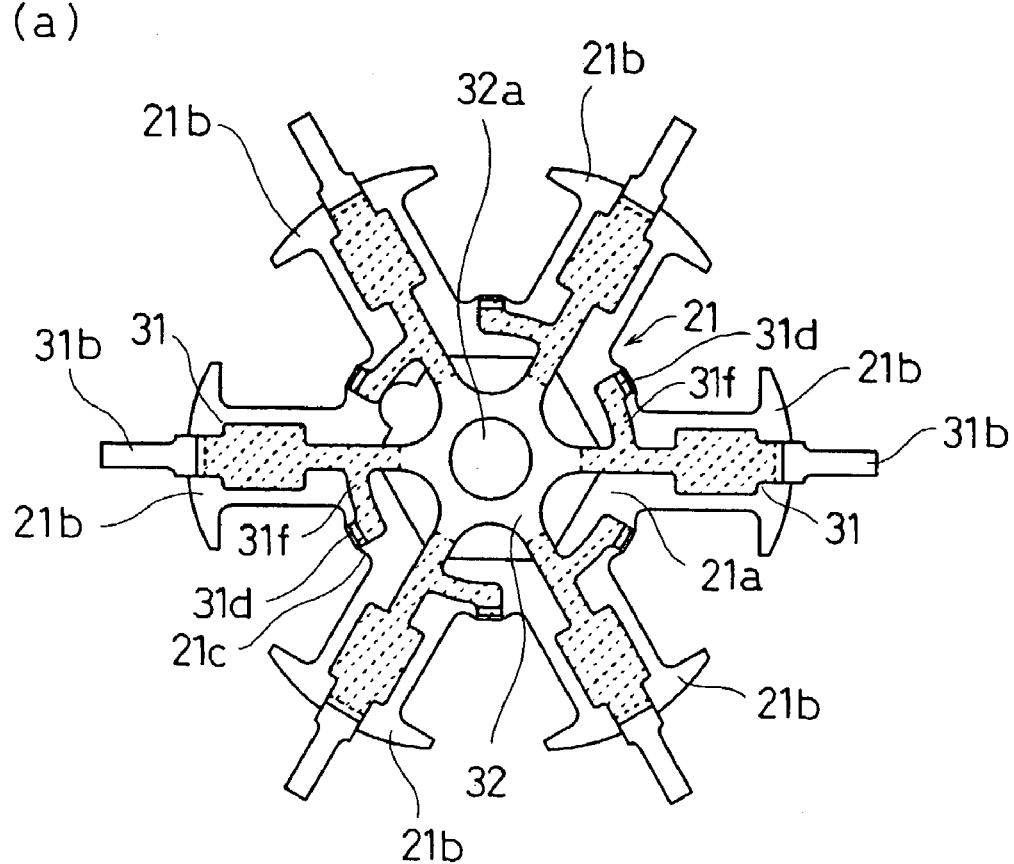
FIGS. 3(a) and 3(b) are diagrams showing a state in which a configuration of FIG. 2 is overlaid on a core.
Figure 3:
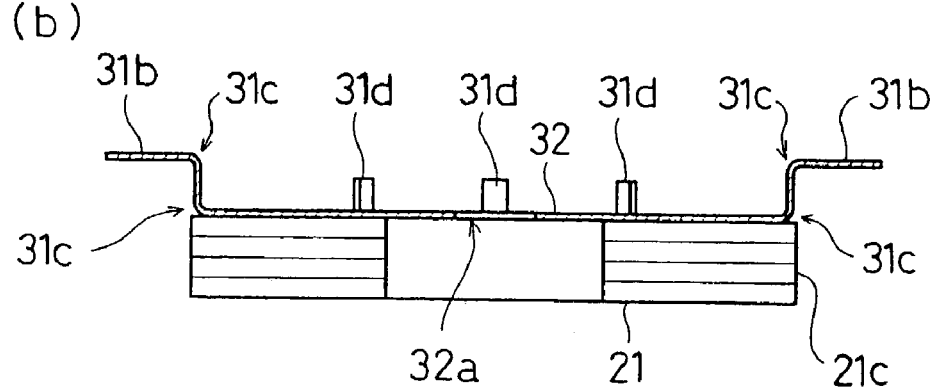
Figure 4:
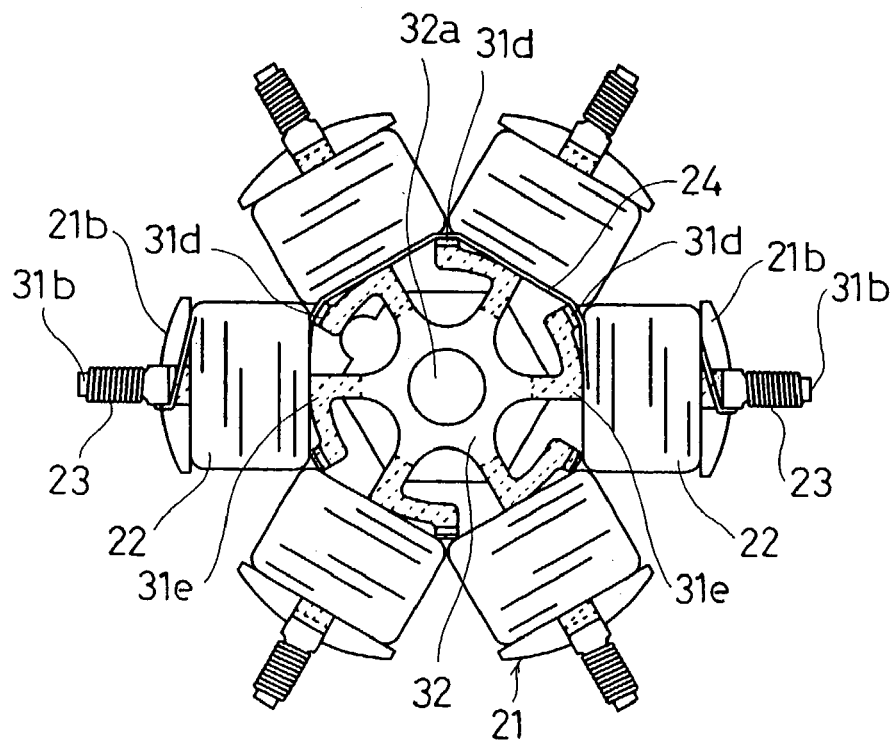
FIGS. 4(a) and 4(b) are diagrams showing a state in which coils are wound in the configuration of FIGS. 3(a) and 3(b)
Figure 4:
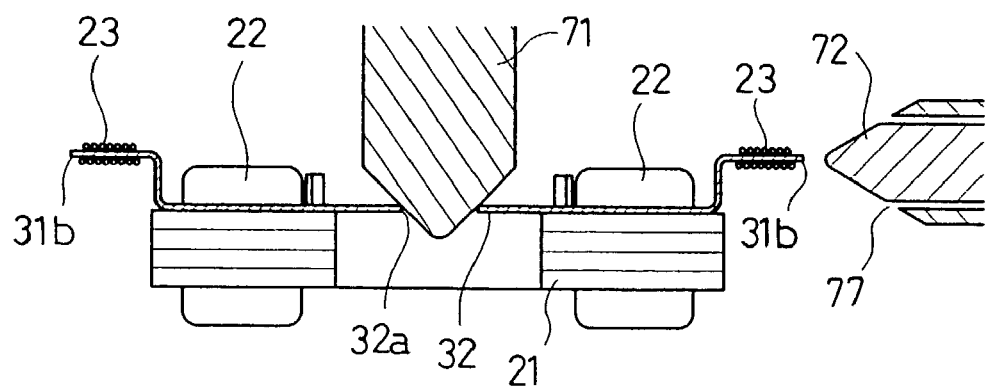

For example, a motor shown in FIGS. 1 to 7 is a brushless motor which is extremely small and thin with an external diameter of about 10 mm. Such a motor is used for vibration alarm in a mobile phone and so on. In FIG. 1, the motor is constituted by a stator (non-rotating part) 1, a rotor (rotary part) 2, and a cover 18. The rotor 2 has a rotor frame 11 as a main body, and a ring-shaped magnet 12 is attached to the inside of the rotor frame 11. An eccentric weight 13 is attached to the rotor frame 11. The rotor frame 11 rotates around a shaft 14 mounted at the center of the rotor frame 11.

The stator 1 has a motor base 15 as a main body. A winding assembly composed of a core 21, coils 22, and terminals 31 is mounted on the motor base 15, and a metal 16 for supporting the shaft 14 is further mounted at the center of the motor base 15. Coil ends 23 are connected to power supply terminals 17 of the motor base 15. Moreover, as described above, the shaft 14 of the rotor 2 is rotatively fit into the metal 16 and is covered with a cover 18 shaped like a cap. The power supply terminal 17 is exposed on the lower surface of the motor so as to make reflow connection on a board (not shown) of equipment.

The completed motor makes reflow connection on the board of the equipment (mobile phone) as described above and power is applied to the coils 22 via the metallic power supply terminals 17 on the lower surface, so that the rotor 2 rotates. Then, the eccentric weight 13 attached to the rotor 2 generates vibration so as to vibrate the equipment.

Since the present invention relates to the structure of the stator 1, the detail of the stator 1 will be discussed below.

FIGS. 2(a) and 2(b) shows the shape of the terminals. In this case, the six terminals 31 are arranged radially and are integrally connected via a connecting member 32 placed at the center. The connecting member 32 has a positioning hole 32a penetrating at the center.

Each of the terminals 31 has a wide base serving as a holding portion 31a, which overlaps the salient pole of the core and an end serving as a coil end connection portion 31b. Further, as described above, the terminals 31 are connected to one another at the holding portions 31a via the connecting member 32 and maintain their positions. Between the holding portion 31a and the coil end connection portion 31b on each of the terminals 31, two bent portions 31c, 31c are formed like a letter Z. Thus, the coil end connection portion 31b is shifted from the holding portion 31a in the axial direction of the motor. On the way to the connecting member 32 from the holding portion 31a, a member 31f integrally extends in the rotating direction of the motor, and the end of the member 31f is bent in the axial direction of the motor to form a crossover wire guide 31d.

The terminals 31 are formed by using a nonmagnetic metal, that is, a copper alloy plate such as a thin phosphor bronze plate with a thickness of about 80 μm. Then, an insulation coating 31e made of a material such as an ultraviolet curing resin and a thermosetting resin is formed on a part of the surface of the terminal 31. In FIG. 2(a), regions indicated by hatching of broken lines represent the insulation coatings 31e. As shown in FIG. 2(a), the insulation coatings 31e are formed on the inside of the bent portions 31c in the diameter direction and on the outside of the connecting member 32 in the diameter direction. Namely, insulation is not made on the bent portions 31c, the coil end connection portions 31b, and the connecting member 32.

For example, the insulation coatings 31e can be formed by evaporation of a polyimide material when a thickness is placed at the highest priority. With this evaporation, a thickness of several μm is applicable. However, the thickness needs to be not less than 3 μm in order to provide withstand voltage of about 300V for the insulation coatings. In FIGS. 2(a) and 2(b), since emphasis is placed on productivity, a coating with a thickness of 10 to 30 μm is formed according to a method of applying and curing a liquid thermal setting resin by screen printing. Further, when priority is placed on withstand voltage and reliability on heat resistance that include a burr formed in a shearing process, a coating with a thickness of about 100 μm may be formed by increasing a thickness of a mask screen or controlling a viscosity of liquid. Therefore, it is preferable that the insulating coatings 31e are each 3 to 100 μm in thickness.

FIGS. 3(a) and 3(b) shows a state in which the terminals 31 are overlaid on the surface of the core 21. The core 21 has a ring part 21a placed around at the center and six salient poles 21b radially extending outward from the ring part 21a. The terminals 31 are placed in contact with the salient poles 21b of the core and are temporarily fixed by adhesive and so on. At this moment the terminal 31 has a thickness of about 0.1 mm including the insulation coating and the motor has a small increase in thickness.

The configurations of the terminals 31 will be discussed again in association with the core 21. The coil end connection portions 31b are separated from the surface of the core 21 in the axial direction of the motor by the bent portions 31c and the coil end connection portions 31b extend radially in parallel with the surface of the core. The bent portions 31c are positioned in the vicinity of an outer circumferential surface 21c of the core and do not protrude outward from the outer circumferential surface 21c in the diameter direction. The connecting member 32 is placed inside the ring part 21a of the core. The members 31f extend over the ring part 21a from the holding portions 31a of the terminals 31, and the crossover wire guides 31d protrude in the axial direction of the motor at the center between the salient poles 21b.

FIGS. 4(a) and 4(b) shows a state in which the coils 22 are wound in the configuration of FIGS. 3(a) and 3(b). In this case, the motor is a three-phase brushless motor and has three pairs of the coils 22 (and salient poles 21b). In FIG. 4(a), for example, the coils 22 are wound around the salient pole 21b on the right end of FIG. 4(a), a crossover wire 24 is routed counterclockwise while being guided by a plurality of the crossover wire guides 31d, and the crossover wire 24 is wound around the salient pole 21b on the left end. The coil ends 23 are wound around the coil end connection portions 31b placed near the ends of the salient poles 21b. The above operation is repeated for three times on three points, so that assembling is completed as shown in FIG. 4(a).

At this moment, the insulation coating 31e of the terminal is formed so as to cover a part of the terminal 31, the part being in contact with the coil 22 and the crossover wire 24, so that insulation is maintained between the terminal 31 and the coil 22. The terminal 31 is in contact with the core 21 as well as the coils 22. Insulation can be similarly obtained by forming the insulation coatings on the core 21. Therefore, in this case, insulation is not always necessary on a part of the terminal 31 that is in contact with the core 21.

Figure 5:
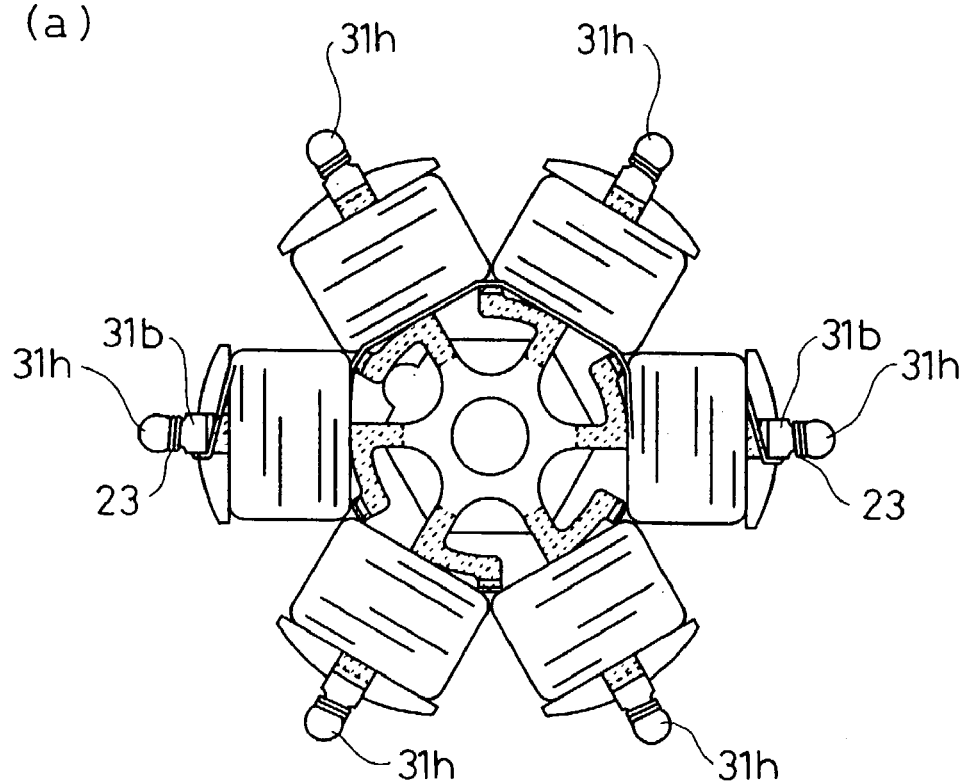
FIGS. 5(a) and 5(b) are diagrams showing a state in which terminals and ends of coils of FIGS. 4(a) and 4(b) are joined by arc welding.
Figure 5:
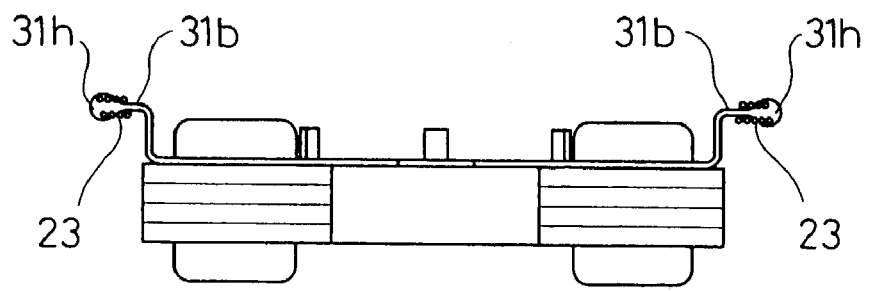
Figure 6:
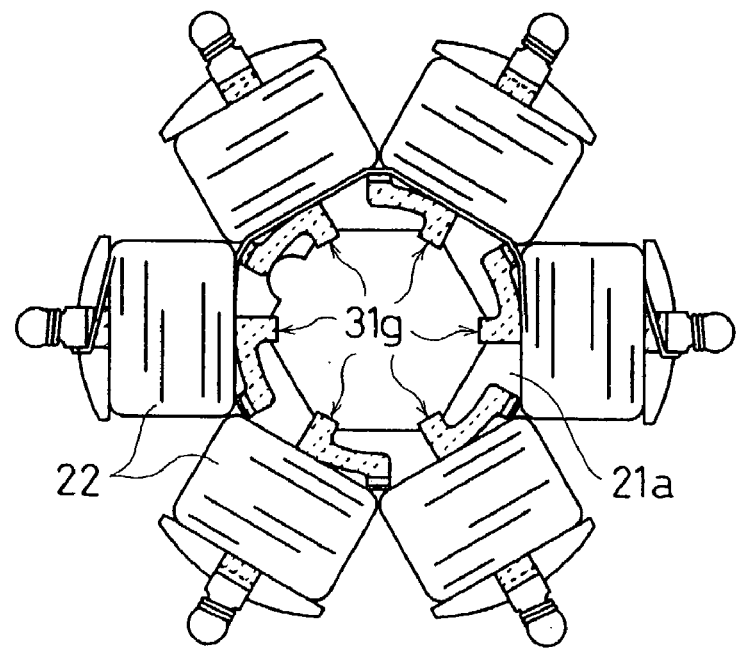
FIGS. 6(a) and 6(b) are diagrams for describing that a connecting member of FIGS. 5(a) and 5(b) are cut and removed.
Figure 6:
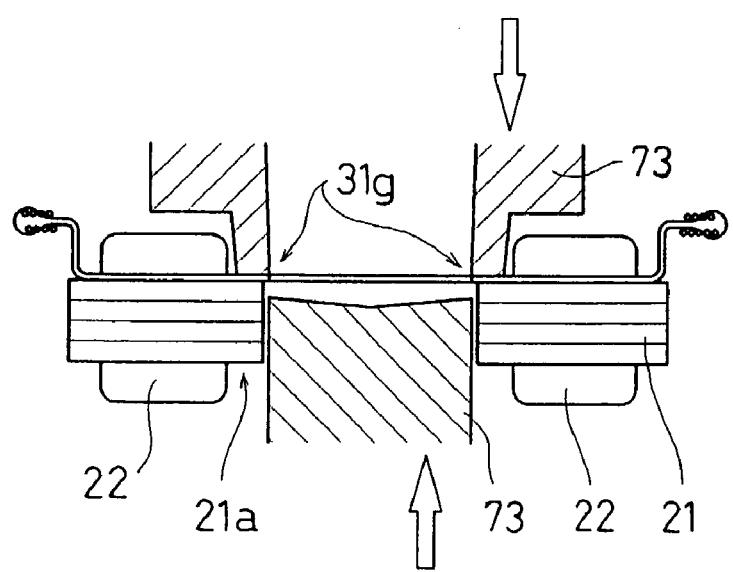
Figure 7:
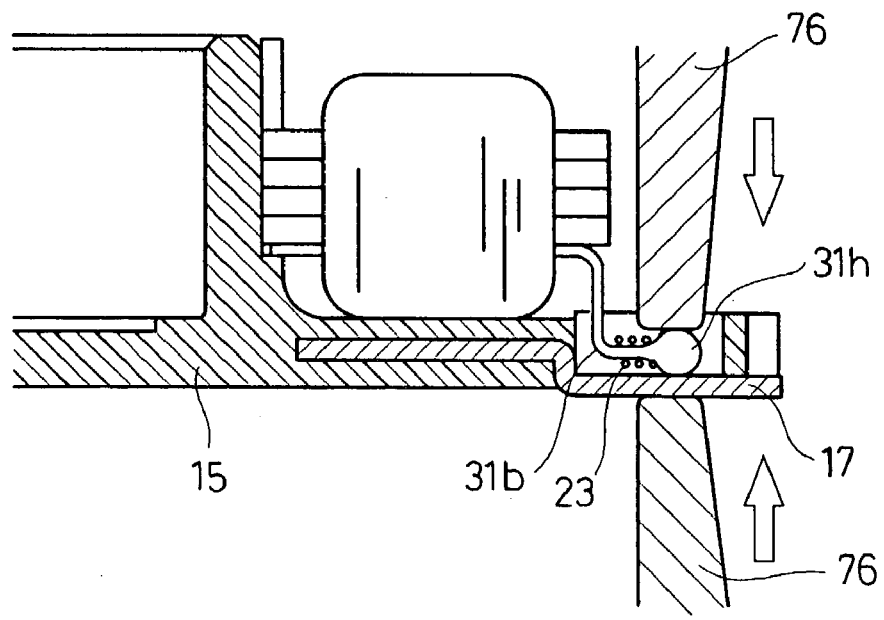
FIGS. 7(a) and 7(b) are diagrams showing a state in which arc welded junctions of FIGS. 6(a) and 6(b) are resistance-welding to power supply terminals.
Figure 7:
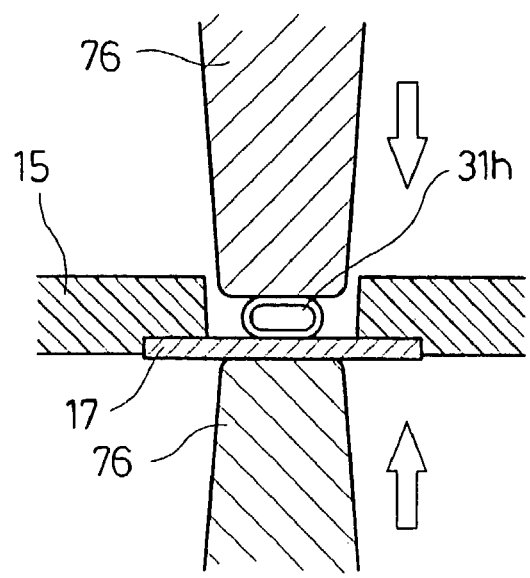
Figure 8:
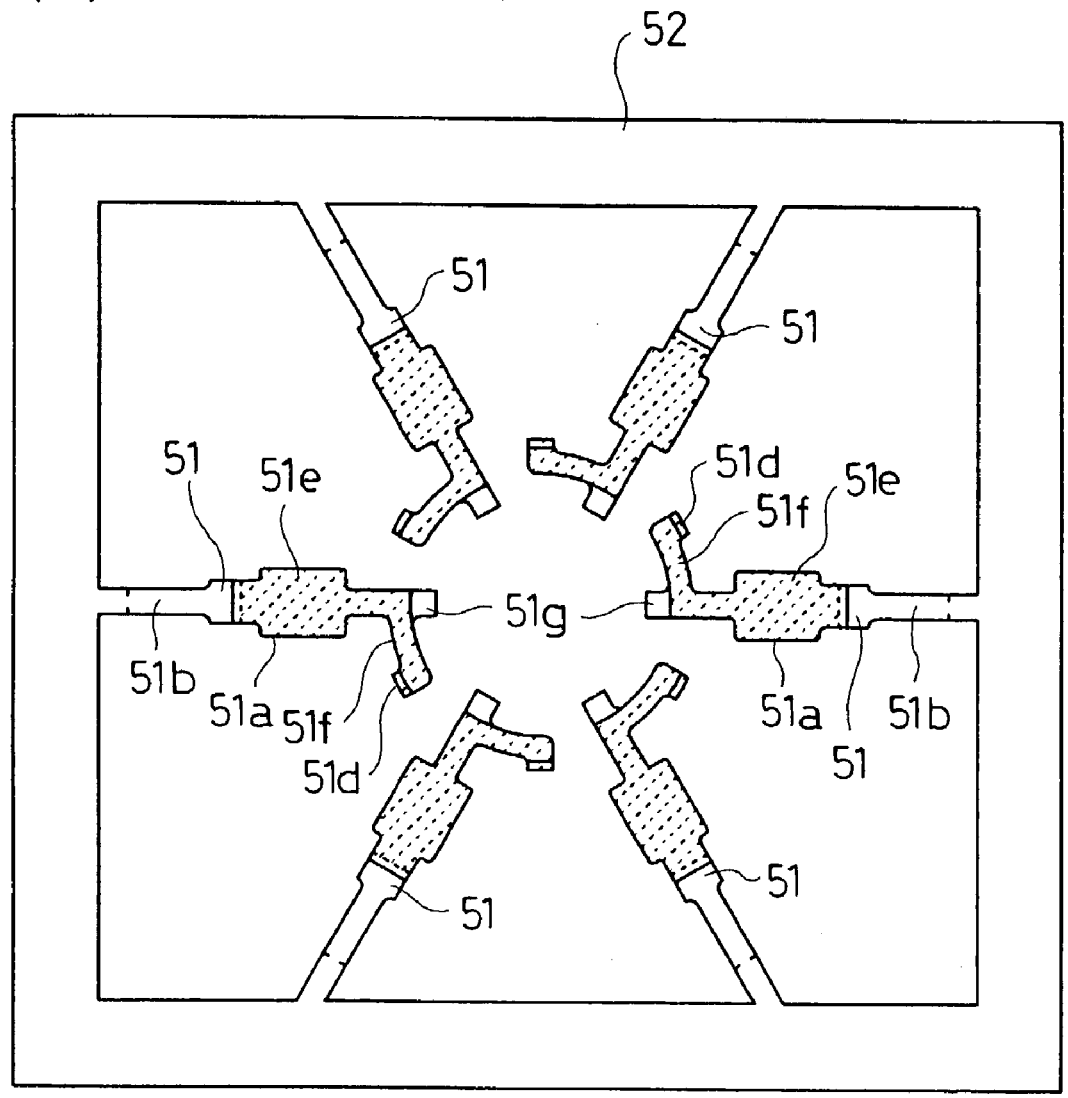
FIGS. 8(a) and 8(b) are diagrams showing that terminals for manufacturing a brushless motor according to Embodiment 2 of the present invention are connected via a connecting member.
Figure 8:
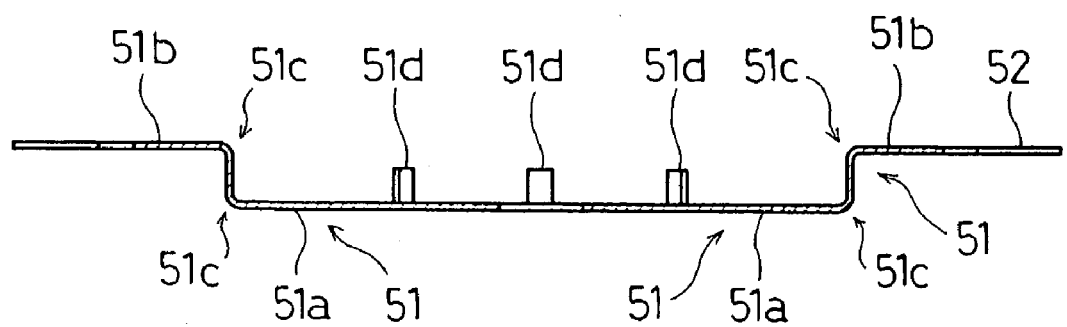
Figure 9:
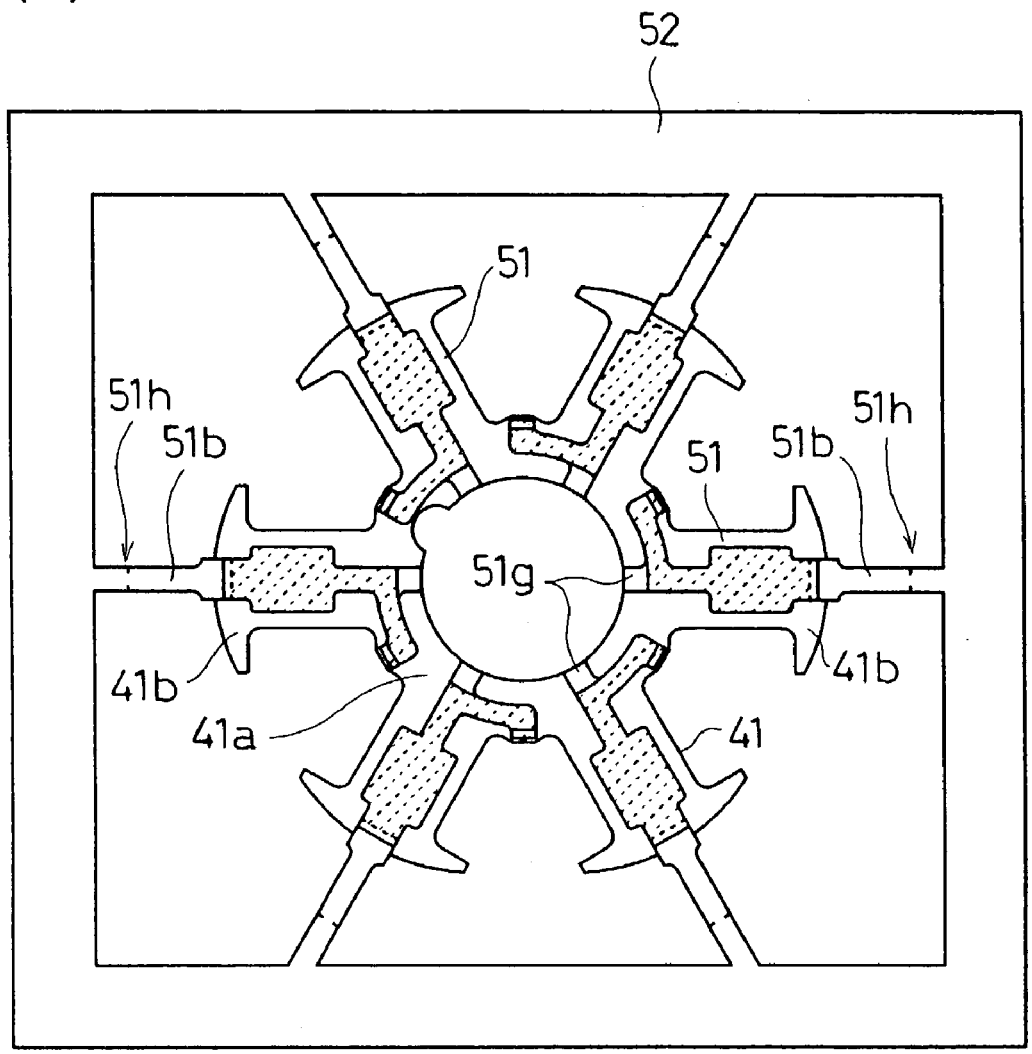
FIGS. 9(a) and 9(b) are diagrams for describing tat the connecting member is cut and removed after the configuration of FIGS. 8(a) and 8(b) are is overlaid on a core.
Figure 9:
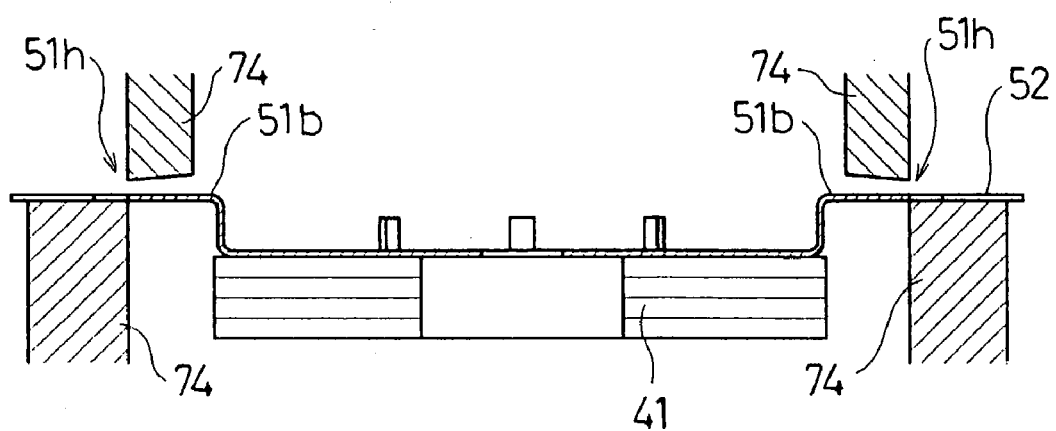
Figure 10:
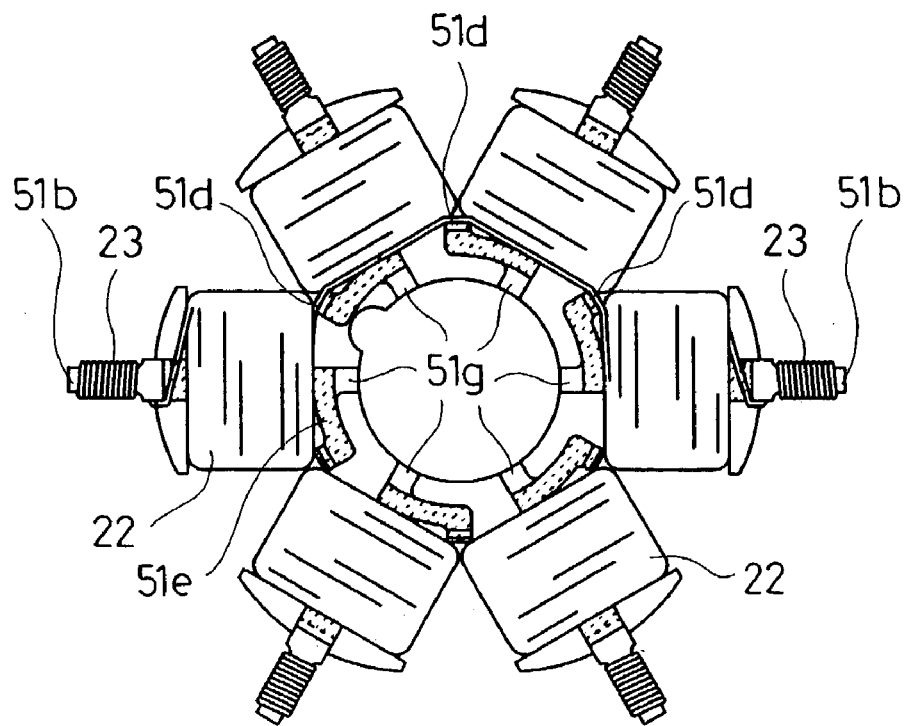
FIGS. 10(a) and (b) are diagrams for describing that coils are wound in a configuration of FIGS. 9(a) and 9(b) and terminals and the ends of coils are joined by arc welding.
Figure 10:
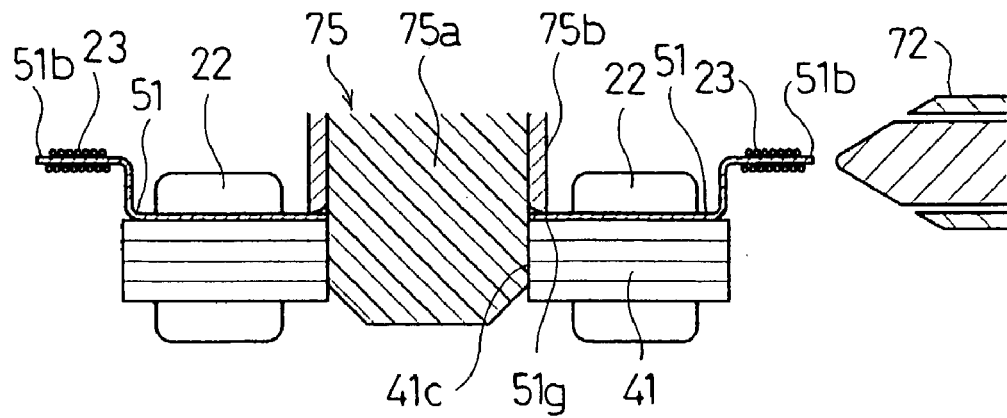

Next, the coil ends 23 are joined to the coil end connection portions 31b by arc welding. First, as shown in FIG. 4(b), an earth electrode 71 of a welding machine is electrically connected to the connecting member 32 at the center of the terminals 31. To be specific, the earth electrode 71 is pressed onto the positioning hole 32a which is formed at a center of the connecting member 32, that is, near the ring part 21a of the core 21 and serves as a metal exposure surface. Regarding the plurality of terminals 31, the metal exposure surface formed by the positioning hole 32a is placed substantially at equal distances from the center of the core 21. A welding electrode 72 is opposed to the end of the coil end connection portion 31b. Then, arc discharge is generated and the coil ends 23 and the coil end connection portions 31b are fused and joined to each other. This operation is performed for six times while the core 21 is rotated by 60°, so that welding is completed. A nonconsumable electrode made of a material such as tungsten is used as the welding electrode 72. A fused portion is covered with inert gas which contains argon and is discharged from a gap 77 on the outer circumference of the welding electrode 72, so that oxidation is prevented. FIG. 5 shows a state in which welding is completed. The base materials of the coil end connection portions 31b are fused and joined so as to cover the coil ends 23. Reference numeral 31h denotes arc welded junctions of the coil end connection portions.

Next, as shown in FIGS. 6(a) and 6(b), the connecting member 32 at the center is cut ant removed by a cutting tool 73. In FIGS. 6(a) and 6(b), a cut portion, that is, an inner circumferential end 31g slightly protrudes to the inside of the ring part 21a. The cutting tool 73 is operated while being guided near the ring part 21a of the core, and the remaining protrusion is minimized. Or the following application is possible: the cut portion 31g is protruded, is engaged to the motor base 15, and is held in the axial direction or the rotating direction.

A winding assembly completed thus is mounted on the motor base 15. This state is shown in FIGS. 7(a) and (b). The arc welded junction 31h of the terminal 31 is overlaid on the power supply terminal 17 of the motor base 15. When this portion is interposed between resistance welding heads 76 and current is applied, heat is generated by Joule heat. When heating is generated and pressure is applied just before dissolution, the arc welded junction, that is, the fused coil end connection portion 31b and the power supply terminal 17 arc welded. Then, assembling is performed as described at the beginning so as to complete the motor.

In this way, the plurality of terminals 31 is connected via the connecting member 32, the earth electrode 71 is connected to the connecting member 32, the coil ends 23 are joined by arc welding, and then, the connecting member 32 is cut and removed, so that the plurality of terminals 31 can be collectively subjected to arc welding. At this moment, in the case of spot heating such as a laser beam, a heated and melted region is small and breaks may occur on the coils. In the case of arc welding, after the coil ends 23 are connected to the ends of the terminals 31 by winding, the base materials of the terminals 31 are melted to perform joining so as to cover the coil ends 23. Therefore, the quality of joining by arc welding is stabilized without a possibility of breaks on the coils. Further, the connection portions of the coil ends 23 are smaller than those of fusing and can be joined by the terminals of low rigidity. Besides, joining by arc welding can be performed in smaller working area than that of fusing. Since the earth electrode 71 is connected to the cut and removed region, arc welding can be performed on a microminiature motor which cannot be provided with a wide metal exposure surface.

The terminals 31 formed of metallic members are arranged on one of the surfaces on the core 21 along the axial direction of the motor, so that the metal exposure surface for connecting the earth electrode 71 can be provided in an advantageous manner. This is because a relatively wide metal exposure surface can be readily formed by using the ring part 21a of the core 21 or a vacant space around the ring part 21a. Moreover, when the earth electrode 71 is connected to the terminals 31 in a collective manner, axial access is the easiest way to have access to all the terminals 31 simultaneously.

The terminals 31 have the inner circumferential ends 31g which protrude inward more than the ring part 21a of the core. Namely, the terminals 31 protrude inward of the core 21 or the edges of the coils 22 in the axial direction of the motor. Hence, in the case of the method of cutting and removing the connecting member 32 after arc welding, a cutting tool can be readily inserted with high workability.

Between the holding portion 31a and the coil end connection portion 31b, the terminal 31 has the bent portions 31c, 31c arranged in the axial direction of the motor. On this point, the outer circumferences of the salient poles 21b and the magnet 12 are close to each other and the terminals 31 held by the salient poles 21b are also close to the magnet 12 in a motor of outer rotor type. Since the bent portions 31c, 31c are provided thus, it is possible to prevent the terminals 31 and the magnet 12 from being in contact with each other. In addition, it is possible to guide the coil end connection portions 31b to positions where the external power supply terminals 17 can be readily positioned and connected. Further, it is possible to increase a distance between the arc welding part and the coil main body, thereby reducing adverse effect such as welding heat on the coils 22.

The coil end connection portions 31b of the terminals 31 are formed perpendicularly to the motor shaft. Thus, even when the length of the junction is varied in the welding process, the positional relationship with the power supply terminals 17 is not changed.

The terminals 31 have parts protruding outward of the periphery of the core 21 or the edges of the coils 22 in the axial direction of the motor at different positions from the connection portions of the coil ends 23. Hence, in the case of the method of cutting and removing the connecting member 32 after arc welding, it is possible to readily pass a cutting tool with high workability.

The arc welded junctions 31h are resistance-welded to the power supply terminals 17, and the arc welded junctions 31h are substantially shaped like spheres as shown in the drawings, thereby fixing the welding conditions of resistance welding. Thus, it is possible to eliminate the necessity for a soldering material on the connection between the terminals 31 and the coil end connection portions 31b as well as the connection between the terminals 31 and the power supply terminals 17.

The terminals 31 are made of a copper alloy, which belongs to the same system as that of the coil 22, thereby achieving preferable quality of joining on a welded connection.

Since the arc welded junctions 31h are positioned outside the core 21 and the edges of the coils 22 in the axial direction of the motor, it is possible to arrange the terminal connection portions of the terminals outside the core 21 and the edges of the coils 22 in the diameter direction. Thus, the resistance welding heads 76 can be readily brought close to each other along the axial direction of the motor and a connecting operation can be readily performed.

The metal exposure surface for the plurality of terminals 31 is positioned substantially at equal distances from the center of the core 21, the metal exposure surface being formed by the positioning hole 32a. Hence, the same earth electrode can be used for all the terminals 31. Moreover, the ring-shaped earth electrode is used which is positioned on the same axis as the center of the core 21, and welding can be performed while rotating and transporting a work.

As described above, in the motor of Embodiment 1, the power supply terminals 17 can be reflow-mounted on a board of equipment and all the electrical connection portions from the power supply terminals to the coil ends are joined by welding. Hence, even when heat of reflow heating is conducted during reflow mounting of the motor into the equipment, it is possible to achieve a microminiature brushless motor without degradation in quality of the electrical connection portions and the product.

EMBODIMENT 2

Referring to FIGS. 8(a) and 8(b) to 10(a) and 10(b), the following will discuss Embodiment 2 of the present invention. In Embodiment 2, the connecting structure of terminals 51 is changed from that of Embodiment 1 and the manufacturing process is changed accordingly. In the following description, drawings and explanations which are redundant or the same as Embodiment 1 will be omitted.

FIGS. 8(a) and 8(b) shows the shapes of the terminals 51. The six terminals 51 are arranged radially and are integrally connected to one another via a frame-shaped connecting member 52 which is placed outside the terminals 51. On each of the terminals 51, a base portion formed inside along the radial direction is a holding portion 51a which is overlaid on a salient pole of a core, and an end formed outside along the radial direction is a coil end connection portion 51b. Then, as described above, the coil end connection portions 51b reconnected via the connecting member 52 and maintain their positions. Two bent portions 51c are placed between the holding portion 51a and the coil end connection portion 51b, so that the coil end connection portions 51b are shifted in the axial direction of the motor. Reference numeral 51d denotes guides for a crossover wire. The guides are formed on the ends of members 51f. An insulation coating 51e is formed on a part of the surface of the terminal 51. In FIG. 8(a), regions indicated by hatching of broken lines represent the insulation coatings 51e. On the terminal 51, the insulation coating is not formed on an inner circumferential end 51g, which is overlaid on a ring part 41a (FIGS. 9(a) and 9(b)) of a core 41, and a metallic surface remains exposed thereon.

FIGS. 9(a) and 9(b) shows that the terminals 51 are overlaid on the surface of the core 41. As shown in FIGS. 9(a) and 9(b), the terminals 51 are placed in contact with salient poles 41b of the core 41 and are fixed by adhesive and so on. Next, the connecting member 52 is cut and removed from the terminals 51. At this moment cutting is made by using a cutting tool 74 of FIGS. 9(a) and 9(b) on ends 51h of the coil end connection portions 51b.

FIGS. 10(a) and 10(b) shows a state in which coils 22 are wound after the connecting member 52 is cut and removed thus. As with Embodiment 1, the process is repeated for three times to complete a winding operation. Next, the coil end connection portions 51b and coil ends 23 are joined to each other by arc welding. First, an earth electrode 75 of a welding machine is electrically connected to metal exposure surfaces on the innermost circumference of the terminal, that is, the inner circumferences 51g. In order to make such connection, the earth electrode 75 shown in FIG. 10(b) is used. The earth electrode 75 is formed by externally fitting a ring-shaped electrode 75b onto a guide bar 75a which is fit into a positioning hole 41c on the innermost circumference of the core 41. The earth electrode 75 is pressed onto the metal exposure surfaces of the terminals 51, that is, the inner circumferences 51g. A welding electrode 72 is opposed to the end of the coil end connection portion 51b. Then, arc discharge is generated to join the coil end connection portions 51b and the coil ends 23 by welding. This operation is performed for six times while rotating the core 41 by 60°, so that welding is completed.

A winding assembly completed thus is placed on a motor base as in the case of Embodiment 1 and the coil end connection portions 51b of the terminals 51 are connected to power supply terminals, so that the motor is completed.

In this way, the metal exposure surface 51g that can connect the earth electrode 75 for welding is provided on a part of the terminal 51, and joining is performed by arc welding after the coil ends 23 are connected to ends 31b of the terminals by winding. Hence, the coil end connection portions 31b can be joined by the terminals 51 which are smaller than those of fusing and can be joined by the terminals 51 of low rigidity. Besides, joining can be performed in a smaller working area than that of fusing.

Since the metal exposure surfaces 51g of the terminals 51 are close to the ring part 41a of the core 41, even thin and weak terminals of a microminiature motor can be supported by the ring part 41a when the earth electrode is connected, achieving a stable operation.

The metal exposure surfaces 51g of the terminals 51 are arranged on the surface of the core 41 in the axial direction of the motor. When the earth electrode 75 is connected to the terminals 51 in a collective manner, axial access is the easiest way to have access to all the terminals 51 simultaneously.

Since the metal exposure surfaces 51g of all the terminals 51 are positioned at equal distances from the center of the core 41, welding can be performed by using the ring-shaped earth electrode 75, which is positioned on the same axis as the center of the core 41, while a work is rotated and transported.

The above explanations discussed some embodiments of the present invention. The present invention should not be limited to the above-described embodiments and various applications are acceptable within the scope of the present invention. For example, the above embodiments only discussed the case where the thin-plate terminals 31 and 51 are held by the salient poles 21b and 41b of the cores 21 and 41. The present invention is applicable to other structures. For example, terminals using square pins may be held by a ring part of a core. Even when the core is not provided, the effect of joining all the electric connection portions by welding can be exerted.

What is claimed is:

1. A brushless motor, comprising:
   a rotor comprising a magnet;
   a plurality of coils connected together for generating a magnetic field for rotatively driving the rotor, each coil having coil wire around an axis;
   a core for holding the coils; and
   a plurality of power supply terminals, each having a removable metal exposure surface for temporarily connecting to a ground electrode,
   wherein
   the core comprises a ring part and a plurality of salient poles extending radially from the ring part, each coil being wound around a corresponding one of the salient poles, and
   an end of each coil comprises a coil end wound around one of said terminals and a junction between said coil end and said one terminal.

2. The brushless motor according to claim 1, wherein the terminals are located on one of the surfaces on the core along an axial direction of the rotor.

3. The brushless motor according to claim 1, further comprising a removable connecting member, wherein said junction is a welded junction, each said terminal comprises a coil end connection portion, said coil end is located on said coil end connection portion, the plurality of terminals extend radially relative to an axis of rotation of the rotor and electrically connect to each other via the connecting member at a location different from the coil end connection portion, and the connecting member is for being cut and removed from the terminals after the coil end is wound around and welded to the coil end connection portion.

4. The brushless motor according to claim 3, wherein each terminal comprises a portion protruding in an outward direction from said axis of one of said coils, the protruding portion being at a position different from said coil end connection portion.

5. The brushless motor according to claim 1, wherein each terminal comprises a metal exposure surface located adjacent to the ring part of the core, for connection to a ground electrode.

6. The brushless motor according to claim 5, wherein the metal exposure surfaces of the plurality of terminals are located substantially at equal distances from a center of the core.

7. The brushless motor according to claim 1, wherein each terminal is held by the core and comprises a first portion between a second portion held by the core and a third portion for connecting the end of the second coil, said first portion being bent in an axial direction of the rotor.

8. The brushless motor according to claim 1, wherein the terminal comprises a portion oriented perpendicularly to an axial direction of the rotor and an end of the coil end is wound around and connected to the portion.

9. The brushless motor according to claim 1, wherein the terminal comprises a copper alloy.

10. The brushless motor according to claim 1, wherein said junction is a welded junction and is located radially outward from the core relative to the axis of rotation of the rotor.

* * * * *